G. M. EATON.
AUTOMATIC PUMPING SYSTEM.
APPLICATION FILED JULY 12, 1917. RENEWED FEB. 18, 1921.
1,376,411.
Patented May 3, 1921.
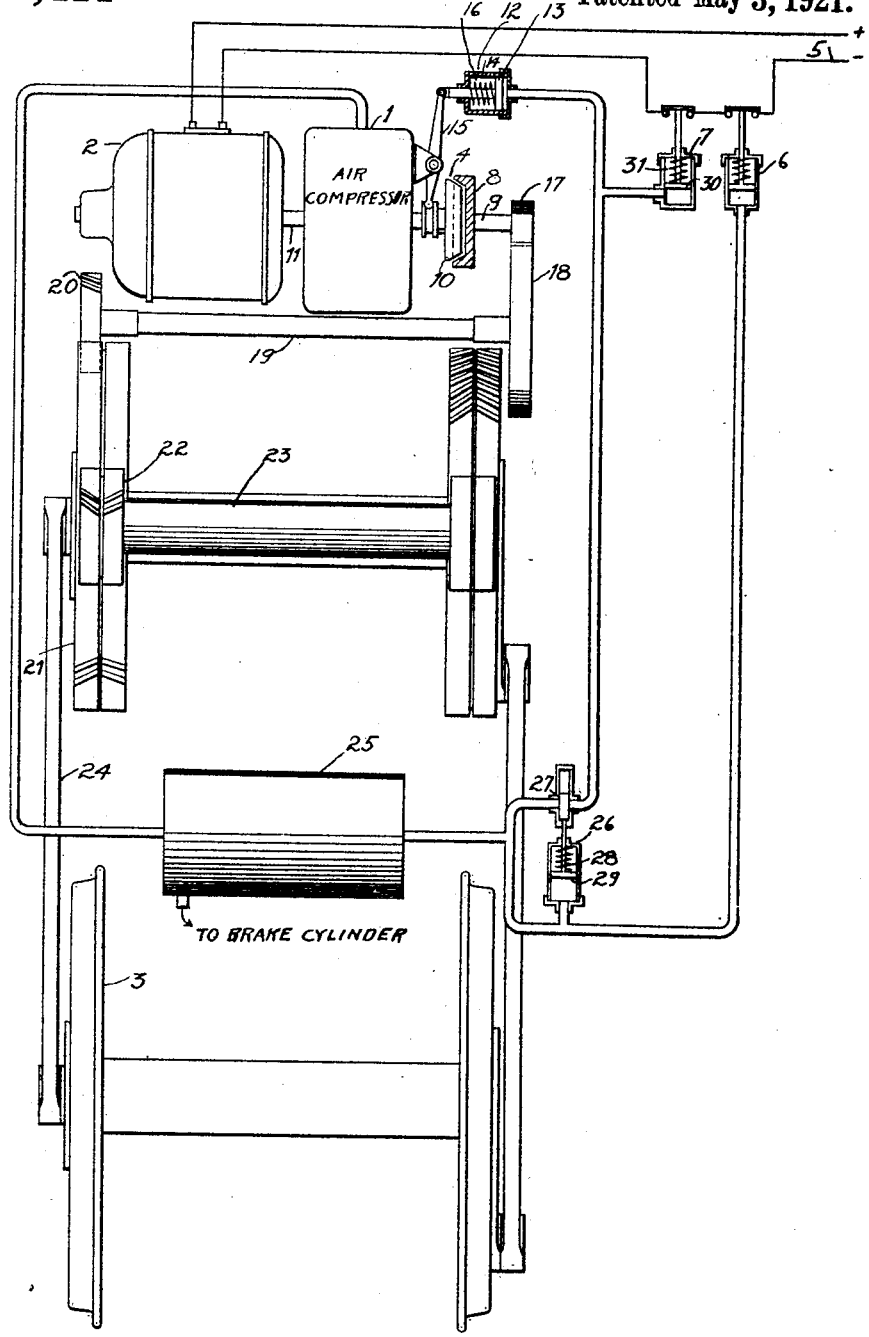
WITNESSES:
INVENTOR
George M Eaton
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC PUMPING SYSTEM.

1,376,411. Specification of Letters Patent. Patented May 3, 1921.

Application filed July 12, 1917, Serial No. 180,077. Renewed February 18, 1921. Serial No. 446,125.

*To all whom it may concern:*

Be it known that I, GEORGE M. EATON, a citizen of the United States, and a resident of Pittsburgh, in the county of Allegheny and State of Pennsylvania, have invented a new and useful Improvement in Automatic Pumping Systems, of which the following is a specification.

My invention relates to fluid braking systems for vehicles and particularly to fluid braking systems for electric locomotives.

One object of my invention is to provide a fluid braking system that shall selectively operate an air compressor from different sources of power in accordance with the fluid pressure in the braking system and insure fluid pressure in the braking system under various operative conditions.

Another object of my invention is to provide a braking system of the above-indicated character that shall embody a fluid compressor, an electric motor for operating the compressor when the pressure in the braking system is reduced to a predetermined point, and means for operating the compressor by the movement of the vehicle in case the fluid pressure in the braking system is reduced to a second predetermined point when the vehicle is in motion.

Another object of my invention is to provide a fluid braking system of the above-indicated character that shall embody a fluid compressor, an electric motor for operating the compressor under predetermined pressure conditions of the braking system, a clutch for connecting the compressor to the wheels of the vehicle in order to operate the compressor by the movement of the vehicle in case the fluid pressure in the braking system is reduced to a second predetermined point when the vehicle is in motion, and means for insuring the breaking of the motor circuit when the compressor is operated by the momentum of the vehicle.

In electric railway systems, and particularly in electric locomotives that are provided with fluid braking systems, it is essential to provide an auxiliary braking system for service in case of failure of the electric power which operates the compressor for the braking system. In the systems now in service, the above difficulty is obviated to a great extent by operating the propelling motors of the vehicle as generators, thereby effecting dynamic-braking, but such a method is objectionable in that the fluid braking system is idle when the same is most needed.

In a braking system constructed in accordance with my invention, means is provided for operating the fluid compressor of the braking system by an electric motor, under normal conditions, and by the movement of the vehicle in case of failure of the current, which operates the compressor motor, when the vehicle is in motion.

The single figure of the accompanying drawing is a diagrammatic view of a braking system constructed in accordance with my invention.

Referring to the drawing, an air compressor 1 is directly connected to a motor 2 and is adapted to be mechanically connected to the wheels 3 of the vehicle by means of a fluid-operated clutch 4. The motor 2 is energized by a supply circuit 5 which is governed by means of the fluid-operated switches 6 and 7.

The clutch 4 embodies a driving member 8, which is mounted on a shaft 9, and a driven member 10, which is mounted on the shaft 11 of the air compressor 1. A fluid-operated device 12 comprises a piston 13, which is disposed within a cylinder 14 and is connected to a lever 15 that is pivoted, intermediate its ends, for operating the clutch 4. The piston 13, when operated in one direction by air pressure, is adapted to hold the members 8 and 10 in frictional engagement with each other, and, when operated in the opposite direction by a spring 16, is adapted to release the clutch 4. A pinion 17 is mounted on the shaft 9 adjacent to the driving member 8 of the clutch 4 and meshes with a gear wheel 18 which is mounted on a shaft 19. The shaft 19 is provided with a pinion 20 to mesh with one of the resilient gear wheels 21 which are associated with the pinions 22 that are mounted on the armature shaft 23. The resilient gear wheel 21 is connected to driving wheels 3 of the vehicle by means of side rods 24 or by any other approved means.

A storage reservoir 25 is provided for the fluid braking system, and a pneumatic device 26 is provided for selectively operating the clutch 4, under predetermined conditions. The pneumatic device 26 embodies a valve 27 which is operated in one direction, by means of a spring 28, to connect the fluid pressure contained in the braking system to the fluid-operated device 12, in order to operate the clutch 4. The valve 27 is operated in a reverse direction to disconnect the fluid-operated device 12 from the braking system when an increased fluid pressure acts upon the piston 29, which is connected to the valve 27.

The fluid-operated switch 7 embodies a piston 30 which is normally held in its lower position by means of a spring 31 to close the supply circuit 5 and is operated in a reverse direction to open the supply circuit whenever air pressure is supplied to the fluid-operated device 12 for operating the clutch 4. The fluid-operated switch 6 is directly connected to the braking system and is adapted to complete the circuit of the motor 2 whenever the pressure within the air-braking system is reduced to a predetermined point.

From the above description, it will be noted that the circuit of the motor 2 will be closed by the switch 6 whenever the pressure contained within the braking system associated with the reservoir 25 is reduced to a predetermined point. In case of failure of the motor 2 or of the current supplied thereto, the pneumatic device 26, which is set to be operated when the pressure contained in the air braking system is reduced to a second predetermined point somewhat lower than the point of operation of the fluid-operated switch 6, is operated. When the device 26 is operated, the fluid-operated device 12 is supplied with fluid pressure in order to close the clutch 4 and mechanically connect the compressor 1, through the clutch 4, pinion 17, gear wheel 18, shaft 19, pinion 20, resilient gear wheel 21 and the side rod 24, to the wheels 3 of the vehicle. The fluid-operated switch 7, which is operated simultaneously with the pneumatic device 12, is provided for opening the circuit of the motor 2 whenever the compressor 1 is operated by the movement of the vehicle and thus preventing the simultaneous operation of the compressor 1 by the movement of the vehicle and by the electric motor 2.

Modifications in the system and arrangement and location of parts may be made within the spirit and scope of my invention and such modifications are intended to be covered by the appended claims.

I claim as my invention:

1. In a braking system for a vehicle, the combination with a fluid compressor, of a motor for operating said compressor under predetermined conditions, and means independent of said motor for operating said compressor by the movement of the vehicle.

2. In a braking system for a vehicle, the combination with a fluid compressor, of a motor for operating said compressor, means for operating the compressor by the movement of the vehicle, and means for selectively operating the compressor by the motor or by the movement of the vehicle.

3. In a braking system for a vehicle, the combination with a fluid compressor, of electrical and mechanical means for operating said compressor, and means for selectively operating said compressor from one of said sources of power in accordance with the fluid pressure in the system.

4. In a braking system, the combination with a fluid compressor and electrical and mechanical means for operating the compressor, of automatic means for selectively operating the compressor from the electrical or the mechanical means in accordance with the fluid pressure in the braking system.

5. In a braking system for an electric vehicle, the combination with a fluid compressor, an electric motor directly connected to the compressor, and a clutch for connecting the compressor to the wheels of the vehicle in order to operate the compressor by the movement of the vehicle under predetermined conditions, of means controlled by the fluid pressure in the system for selectively operating the compressor by the motor or by the movement of the vehicle.

6. In a braking system for a vehicle, the combination with a fluid compressor, an electric motor directly connected thereto, and means for operating the compressor by the movement of the vehicle, of means for selectively operating the compressor from said sources of power in accordance with the fluid pressure of the system, and means for preventing the simultaneous operation of the compressor by the motor and by the movement of the vehicle.

7. In a braking system for an electric vehicle, the combination with a fluid compressor, an electric motor connected to the compressor, and a fluid-operated clutch for connecting the compressor to the wheels of the vehicle in order to operate the compressor by the movement of the vehicle, of fluid-operated means for effecting operation of the compressor by the motor when the fluid pressure in the braking system is lowered to a predetermined point, means for operating said clutch to operate the compressor by the movement of the vehicle when the fluid pressure in the braking system reaches a second predetermined point, and means for insuring the opening of the motor circuit when the compressor is operated by the movement of the vehicle.

8. In a braking system for an electric vehicle, the combination with a fluid compressor, an electric motor for operating the compressor, and mechanical means for operating the compressor by the movement of the vehicle, of means for selectively operating said compressor from the one or the other of said sources of power in accordance with the fluid pressure in the system.

9. In a braking system for a vehicle, the combination with a fluid compressor, of means for electrically operating the compressor, and mechanical means for automatically operating the compressor in case of failure of the electric power.

10. In a braking system for a vehicle, the combination with a fluid compressor, an electric motor for operating the compressor, and means for mechanically operating the compressor by the movement of the vehicle, of means for operating the compressor by the motor when the fluid pressure is reduced to a predetermined point, and means for operating the compressor by the movement-operated means when the fluid pressure is reduced to a second predetermined level.

11. In a fluid-pressure system, the combination with a compressor, of two separate means for operating said compressor, and means for operating the compressor from the one or the other of said operating means in accordance with the pressure in the system.

12. In a fluid-pressure system, the combination with a compressor, of a plurality of means for operating the compressor, and means for selecting one of said operating means in accordance with the pressure in the system to operate the compressor.

13. The combination with a compressor and a plurality of independent power means for operating the same, of automatic means for selectively rendering said operating means effective.

14. The combination with a compressor and a plurality of independent power means for operating the same, of means for preventing the operation of one of said operating means when another of said operating means is operative.

15. In a fluid-pressure system, the combination with a compressor and a motor for operating the same, of a pair of governors for respectively rendering said motor ineffective when the pressure in said system is above and below predetermined values.

16. In a fluid-pressure system, the combination with a compressor and a pair of means for selectively operating the same in accordance with the value of the pressure in said system, of a governor responsive to the pressure in said system for rendering one of said means inoperative when said other means is operative.

17. In a fluid-pressure system, the combination with a compressor, of a plurality of means for operating said compressor, and a normally disconnected clutch associated with one of said means, said clutch being responsive to the pressure in the system for coupling the corresponding operating means to said compressor.

18. In a braking system for a vehicle, the combination with a fluid compressor, of power means for normally operating said compressor, a normally inoperative clutch, and means responsive to the pressure in the system for rendering said clutch operative to drive said compressor by the movement of the vehicle.

In testimony whereof I have hereunto subscribed my name this 29th day of June, 1917.

GEORGE M. EATON.